US006055508A

United States Patent [19]
Naor et al.

[11] Patent Number: 6,055,508
[45] Date of Patent: Apr. 25, 2000

[54] METHOD FOR SECURE ACCOUNTING AND AUDITING ON A COMMUNICATIONS NETWORK

[75] Inventors: Moni Naor; Binyamin Pinkas, both of Tel-Aviv, Israel

[73] Assignee: Yeda Research and Development Co. Ltd., Rehovot, Israel

[21] Appl. No.: 09/092,069

[22] Filed: Jun. 5, 1998

[51] Int. Cl.[7] .............................. G06F 15/00; H04L 9/00
[52] U.S. Cl. .......................... 705/11; 705/404; 705/405; 713/168
[58] Field of Search .............................. 705/11, 404, 405; 713/168

[56] References Cited

U.S. PATENT DOCUMENTS

| | | | |
|---|---|---|---|
| 5,715,164 | 2/1998 | Liechti et al. | 705/410 |
| 5,778,066 | 7/1998 | Shah et al. | 705/62 |
| 5,799,083 | 8/1998 | Brothers et al. | 380/239 |
| 5,963,914 | 10/1999 | Skinner et al. | 705/11 |

OTHER PUBLICATIONS

Mogul, Jeffrey and Leach, Paul J.; "Simple Hit–Metering for HTTP, Preliminary Draft", HTTP Working Group, pp. 1–30, Jan. 1997.
Shamir, U., "How to Share a Secret", Massachusetts Institute of Technology.
Rabin et al., "Verifiable Secret Sharing and Multiparty Protocols with Honest Majority", Institute of Mathematics and Computer Science The Hebrew University of Jerusalem, Israel, pp. 73–85, (1989).
Novak et al., "New Metrics for New Media: Towards the Development of Web Measurement Standards", Vanderbilt University.
Naor et al., "Secure and Efficient Metering", Department of Applied Mathematics and Computer Science Weizmann Institute of Science, Rehovot, Israel, Jun. 4, 1998.
Merkle, R., "A Certified Digital Signature", pp. 218–239, (1979).
Lesk, M., "Projections for Making Money on the Web", Harvard Infrastructure Conference, (1997).
Jarecki S., "An Efficient Micropayment System Based on Probabilistic Polling", (1997).
Franklin et al., "Auditable Metering with Lightweight Security", AT&T Labs, Feb. 1997.
Frankel et al., "Optimal–Resilience Proactive Public–Key Cryptosystems".
Feldman et al., "An Otimal Probabilistic Protocol for Synchrinous Byzantine Agreement", Society for Industrial and Applied Mathematics, 26:873–933, (1997).
Feldman, "A Practical Scheme for Non–interactive Verifiable Secret Sharing", Massachusetts Institute of Technology, pp. 427–437, (1987).
Fang, "Building an Accounting Infrastructure for the Internet", Princeton University.
Dwork et al., "Pricing via Processing of Combatting Junk Mail", pp. 1–11.
Desmedt et al., "Threshold cryptosystems", EE & CS Department University of Wisconsin–Milwaukee.
Coalition for Advertising Supported Information and Entertainment, "Interactive Media Audience Measurements", (1997).
Carter et al., "Universal Classes of Hash Functions", *Journal of Computer and System Sciences,* 18:143–155, (1979).

*Primary Examiner*—Tod R. Swann
*Assistant Examiner*—James W. Myhre
*Attorney, Agent, or Firm*—Browdy and Neimark

[57] ABSTRACT

A method for secure accounting and auditing of a communications network operates in an environment in which many servers serve an even larger number of clients (e.g. the web), and are required to meter the interaction between servers and clients (e.g. counting the number of clients that were served by a server). The method (metering process) is very efficient and does not require extensive usage of any new communication channels. The metering is secure against fraud attempts by servers which inflate the number of their clients and against clients that attempt to disrupt the metering process. Several secure and efficient constructions of this method are based on efficient cryptographic techniques, are also very accurate, and preserver the privacy of the clients.

21 Claims, 2 Drawing Sheets

METHOD FOR SECURE ACCOUNTING AND AUDITING ON A COMMUNICATIONS NETWORK

FIELD OF THE INVENTION

This invention relates a method for accounting and auditing of communications networks.

BACKGROUND OF THE INVENTION

The majority of Internet revenues come from connectivity and advertisement fees, yet there are almost no means to secure the accounting processes, which determine these fees from fraudulent behavior, e.g. a method to provide reliable usage information regarding a Web site. There is an enormous financial incentive for the Web site to inflate this data, and therefore measurement methods should be secure against malicious behavior of the site. Measurement methods which are based on sampling are relatively protected from corrupt behavior of Web sites but do not provide meaningful data about small and medium scale sites.

There has been a considerable amount of work on securing online payments. However most of the revenues from Internet ventures do not come from direct sales: the largest sums of money are by far those paid for advertising and for connectivity to the Internet. There are many different forecasts for the future distribution of Internet revenues but many of them agree that advertising and connectivity will remain the major sources of income from the Internet. In light of these figures it is surprising how little research has been conducted towards securing the accounting mechanisms that are used by advertising and connectivity providers.

Most of the revenues of Web sites come from advertisement fees. Although there are different forecasts for the market share of online advertising, the estimations are that very large sums of money will be invested in this media. Like in every other advertising channel, Web advertisers must have a way to measure the effect of their ads, and this data affects the fees that are charged for displaying ads. Advertisers must therefore obtain accurate and impartial usage statistics about Web sites and about page requests for pages that contain their ads. Web sites on the other hand have an obvious motivation to inflate their usage reports in order to demand more for displaying ads.

In the pre-Web world there were two main methods for measuring the popularity of mediate channels, sampling and auditing. Sampling, like the Nielsen rating system for TV programs, is survey based. It picks a representing group of users, checks their usage patterns and derives usage statistics about all the users. In traditional types of media like television this method makes sense since users have a relatively limited number of viewing options to choose from. These types of media use broadcast, which operates in a one-to-many communication model. The Web operates in a many-to-many communication model and offers millions of Web pages to visit. Therefore although sampling based metering services are offered for the Internet, they do not provide meaningful results for any but the most popular Web sites.

Auditing is performed by trusted third party agencies, like the Audit Bureau of Circulations (ABC) which audits print circulation. Although the sites often offer such information regarding Web sites themselves, it should be taken with a grain of salt. The Coalition for Advertising Supported Information and Entertainment (CASIE) states in its guidelines for interactive media audience measurement that "Third party measurement is the foundation for advertiser confidence in information. It is the measurement practice of all other advertiser-supported media". There are a number of companies (like Nielson/IPRO, NetCount, etc.) which offer third party based audit services for the Internet. They typically install some monitoring software at the server that operates the site. However, the reliability of such audit data depends on the site providing accurate data or not breaking into the monitoring module. Sites have a huge financial interest to exaggerate their popularity. The lesson learnt from software and pay-TV piracy is that such financial interests lead to corrupt behavior that overcomes any "lightweight security" mechanism.

Today most Web advertising is displayed on a very small number of top popularity Web sites, like "Yahoo!" or CNN. It may be plausible that in spite of the great financial motivation such established sites will not provide inflated usage reports or break into audit modules that report their activities.

However, while this may be true for the big sites, a large amount of advertising is displayed on smaller scale sites. It can also be argued that one of the main reasons that drive advertisers to use only the biggest sites is the lack of reliable audit data on smaller scale sites. The Web is so attractive because one can set a site of interest to perhaps only 10,000 users worldwide. This number may suffice to attract some advertisers, provided there are reliable usage statistics.

Advertisers can learn about the exposure of their ads by counting "click throughs", i.e. the number of users who clicked on ads in order to visit the advertiser's site. "Doubleclick" reported in 1996 that 4% of the visitors who view an ad for the first time actually click on it. This ratio changes according to the content of the ad, and therefore gives very limited information to the advertiser. Another method that advertisers can use is to display the ads form their own server (even when they are displayed in other sites) and eliminate the risk of unreliable reports from sites. However, this method burdens the advertiser with sending its ads to all their viewers and prevents the distribution of this task. The original communication pattern is not preserved since a new channel (between the advertiser and the client) is used. The load on the advertiser's server is huge and is surely not acceptable for a one-time advertiser. This solution is non-scalable, introduces a single point of failure (the advertiser), and is also insecure against "fake" requests created by the site displaying the ads.

Currently thereof no single accepted standard or terminology for Web measurement. Novak and Hoffman argue that standardization is a crucial first step in the way for obtaining successful commercial use of the Internet. They also claim that interactivity metrics rather than the number of hits or the number of visitors should be used to meter a site's popularity. The method of the present invention is defined to count the number of visits that a Web site receives. For purposes of presenting a general embodiment of the method of the present invention, this definition does not need to define a visit precisely. For example, it can be set to be a click, a user, a session of more than some threshold of time or of page requests from a single user; or any similar definition. The main requirement is that the measurement be universal to all clients and can be consolidated (for instance, a detailed report of the path of pages that each client went through in its visit cannot be consolidated into a single result. The number of clients whose visit lasted more than 15 minutes can be represented as a single number). The emphasis in this paper is in obtaining reliable usage statistics even when servers may try to act maliciously, and not in defining the type of statistics that are needed.

Pitkow discussed the problems caused by caching and by proxy usage, which hide usage information from Web servers. Possible solutions like temporal analysis, cache busting, and sampling were suggested.

Franklin and Malkhi were the first to consider the metering problem in a rigorous approach. Yet their solutions only offer "lightweight security"; clients can refrain from helping servers count their visits, servers can improve their count, and the variance of the measurement is relatively high. Such solutions cannot be applied if there are strong commercial interests to falsify the metering results.

Micropayments are an alternative method for financing online services. Their implementations are designed to be very efficient in order for their overhead to be less than the value of the transactions. Micropayments can be used for web metering, where each visit would require the client to send a small sum of "money" to the server, which would prove many visits by showing that is earned a large sum of money. However, all the current suggestions for micropayment schemes require the communication from the merchant (i.e. the server) to the bank (i.e. the audit-agency) to be of the same order as the number of payments that the merchant received. This means that the amount of information that the audit-agency receives is of the order of the total number of visits to all the metered servers. The method of the present invention is a more efficient metering scheme since there is no need to deduct "money" for clients' accounts.

The Internet is based on packet switching, i.e. there is no dedicated path between two parties that are communicating through the Internet, but rather each packet of information is routed separately. The Internet is essentially a network of networks and packets are typically routed through several different networks. These properties complicate pricing and accounting mechanisms for Internet usage, and indeed the most common pricing method is to charge a fixed price which is independent of the actual number of packets which are transferred. Pricing theory based analysis indicates that pricing Internet services according to the actual usage (at least at times of network congestion) is superior in terms of network efficiency. Usage based pricing has a disadvantage of incurring accounting and billing costs. It is impractical to create detailed account reports (similar to telephone accounts) due to the huge number of packets. Some are suggesting measuring usage using sampling or only at times of congestion (however, even producing reports for a sample of say, $\frac{1}{1000}$ of the packets creates inconceivably large reports). MacKie-Mason and Varian also expect breakthroughs in the area of in-line distributed accounting that will lower the costs of Internet accounting.

A problem, which needs to be addressed, is the notion of secure and efficient metering of the amount of service requested from servers by clients, in Web applications and the like. Such metering methods should be realized without substantial changes to the operation of clients and servers (though they may require a change in the clients software and a registration process) and to their communication patterns.

References

Aho A., Hopcroft J. and Ullman J., The design and analysis of computer algorithms, Addison-Wesley, 1974.

Ben-Or M., Goldwasser S. and Wigderson A., Completeness theorems for noncryptographic fault tolerant distributed computation, 20th STOC, 1988, 1–9.

Biham, E. and Shamir, A., Differential fault analysis of secret key cryptosystems, in: Crypto '97, Springer-Verlag LNCS 1294, pp. 513–525.

Carter L. and Wegman M., Universal hash functions, J. of Computer and System Sciences, Vol. 18, 1979, 143–154.

Claffy, K., Braun, H. -W. and Polyzos, G., Applications of sampling methodologies to wide-area network traffic characterization, TR CS93-275, UCSD, 1993.

Coalition for advertising supported information and entertainment, CASIE guiding principles of interactive media audience measurement, April 1997, available at http://www.commercepark.com/AAAA/casie/gp/guiding principles.html.

Desmedt Y. and Frankel Y., Threshold cryptosystems, Crypto '89, LNCS 435, 1990, 307–315.

Diffie, W. and Hellman, M. E., New directions in cryptography, in: IEEE Trans. on Information Theory, November 1976, pp. 644–654.

Dwork C. and Naor M., Pricing via Processing or Combating Junk Mail, Crypto '92, LNCS 576, 1992, 114–128.

Estrin, D. and Zhang, L., Design considerations for usage accounting and feedback in Internet-works, ACM Computer Communications Review, 20(5):56–66, 1990.

Fang, W., Building an accounting infrastructure for the Internet, in: IEEE Global Internet, 1996, available at http://www.cs.princeton.edu/~wfang/Research/revised.ps.

Feldman P., A practical scheme for non-interactive verifiable secret sharing, 28th FOCS, 1987, 427–437.

Feldman P. and Micali S., An Optimal Probabilistic Protocol for Synchronous Byzantine Agreement, SIAM J. on Comp., Vol. 26, No. 4, 1997, 873–933.

Frankel Y., Gemmell P., MacKenzie P. D. and Yung M., Optimal-resilience proactive public-key cryptosystems, 38th FOCS, 1997, 384–393.

Franklin M. K. and Malkhi D., Auditable metering with lightweight security, Financial Cryptography '97, 1997.

Gupta, A., Stahl, D. O. and Whinston, A. B., Pricing of services on the Internet, in: F. Phillips and W. Cooper (Eds.), IMPACT: How ICC Research Affects Public Policy and Business Markets. Greenwood Pub, 1994.

J. Kilian, Founding Cryptography on Oblivious Transfer, 20th STOC, 1988, 20–31.

Jarecki S. and Odlyzko A., An efficient micropayment system based on probabilistic polling, Financial Cryptography '97, 1997.

Lesk, M., Projections for making money on the Web, in: Harvart Infrastructure Conference, Jan. 23–25, 1997, available at http://community.bellcore.com/lesk/iih/iih.html MacKie-Mason, J. K. and Varian, H. R., Pricing the Internet, in: B. Kahin and J. Keller (Eds.), Public Access to the Internet. Prentice-Hall, 1994.

Merkle R., A certified digital signature, Crypto '89, LNCS 435, 1990, 218–238.

McCormac, J., European Scrambling Systems 5, Waterford University Press, Waterford, 1996.

McEliece, R. J. and Sarwate, D. V., On sharing secretes and Reed-Solomon codes, Comm. ACM, 24(9): 583–584, September 1981.

Murphy, I. P., On-line ads effective? Who knows for sure?, Marketing News, 30(20): 1–38, September 23, 1996.

Naor, M., and Pinkas, B., Secure and Efficient Metering, Advances in Cryptology—Eurocrypt '98, Springer-Verlag, 1998.

Novak T. and Hoffman D., New metrics for web media: toward the development of web measurement standards, September 1996. Manuscript available at http://www2000.ogsm.vanderbilt.edu/novak/web.standards/webstand.html Pedersen T. P., Non-interactive and information-theoretic secure verifiable secret sharing, Crypto '91, LNCS 576, 1991, 129–140.

Pitkow, J., In search of reliable usage statistics on the WWW, in: Proc. of the 6th International WWW Conf., 1997, available at http://www6.nttlabs.com/HyperNews/get/PAPER126.html Rabin T. and Ben-Or M., Verifiable secret sharing and multiparty protocols with honest majority, 21st STOC, 1989, 73–85.

Kinsman M., Web advertising 1997: market analysis and forecast, Cowles/Simba Information, Stamford, Conn. May 1997.

Shamir A., How to share a secret, Comm. ACM Vol. 22, No. 11, 1979, 612–613.

Wegman M. and Carter L., New hash functions and their use in authentication and set equality, J. of Computer and System Sciences, vol. 20, 1981, 265–279.

Yao A. C., How to generate and exchange secretes, 27th FOCS, 1986, 162–167.

SUMMARY OF THE INVENTION

The present invention relates to methods for measuring the amount of service requested from servers by clients in a communications network. The methods are secure and efficient, and provide a short proof for the metered data. The method of the present invention does not require the use of tamper resistant modules at the client nor at the server. Immediate applications are a secure measurement of visits to a Web site and a secure usage based accounting mechanism between networks. In the context of the present invention, the "web" is used as an archetype example for a communications network. It should be recognized that many other styles of networks are amenable for using the method of the present invention; computer networks, telecommunications networks, and the like.

The method of the present invention provides validated measurements of the amount of service that servers perform for their clients, in a manner that is efficient and is secure against fraud attempts by servers and clients. There are two main applications for such methods: a certified measurement of the usage of Web sites, and measurement of the amount of traffic that a communication network delivers. Both these applications have a tremendous financial importance which makes them targets for fraud and piracy, as was the case with software and pay TV piracy which became multi-million dollar businesses (see for example McCormac for a detailed description of TV piracy practices). It must be concluded that it is essential to develop mechanisms that ensure the authenticity and accuracy of usage measurements against malicious and corrupt parties.

According to the method for secure accounting and auditing of a communications network of the present invention, the network has at least one server, a plurality of clients, and at least one audit-agency. This method includes the steps of: initializing, beginning of a metered time frame, interacting with a client, and processing at end of time frame. The initializing includes an audit-agency choosing a substantially random key and the audit-agency securely sending, to each server and to each client, data that depends on at least the key and on identity-data of the server or the client receiving the sending. The beginning of a metered time frame includes the audit-agency sending a challenge to at least one server. The interacting with a client, of the initialized clients, includes firstly a server sending to the client a challenge which depends on at least the challenge that the server received from the audit-agency, and secondly the client replying with an answer that is computationally dependant on the challenge that the client received and on information that the client received in its initialization step. The processing at end of time frame includes firstly a server performing a computation which depends on at least the answers the server received from clients, and secondly sending to the audit-agency a compact proof for the number of clients served by the server.

According to an embodiment of the present invention, sending to the client a challenge is accomplished implicitly by computations of the servers and of the clients. According to another variation of the present invention, sending to the server a challenge is accomplished implicitly by computations of the audit-agency and of the servers.

According to another embodiment of the present invention a proof for the number of clients served, being K clients visiting a server S in a time period T, includes:

(a.) in the initializing, the audit-agency generating a random polynomial $Q(x,y)$ over a predetermined finite field $Z_p$, of degree $k-1$ in x and $d-1$ in y; and each client C receiving the polynomial $Q_c(y)=P(C,y)$ which is constructed from P by substituting C for x, and is of degree $d-1$ in y;

(b.) such that a client C that visits server S at date t sends a value $Q_c(S_t)=P(C,S_t)$ wherein $S_t$ is a function of S and t, in $Z_p$;

(c.) and a proof generation includes, for the polynomial $P(x,S_t)$, after serving k clients in time period T, S interpolating the polynomial and calculating $P(0,S_t)$;

(d.) and a proof of serving k clients in time period T by the audit-agency includes verifying this value by evaluating the polynomial P at a predetermined location.

According to embodiments of the method of the present invention, the computational dependency of the challenge is based on hash trees, on quorum systems, on pricing-via-processing, on secure function evaluation, on micro-payments, or the like.

According to another embodiment of the method of the present invention, the computational dependency of the challenge is based on secret sharing. Furthermore, error-correcting properties are used to reconstruct the secret.

According to another embodiment of the present invention, the interacting includes a client sending a share to a server, said server evaluating a polynomial of degree $d-1$ wherein said evaluating uses a computation requiring d multiplications using Horner's rule, and said evaluating is performed in a field $Z_p$ wherein $1/p$ is the error probability.

The field $Z_p$ is set to be 32 bits long, to be with $2^{32}-5$ elements, to be a Galois field with $2^{32}$ elements, or the like.

According to an embodiment of the method of the present invention, the clients are divided at random into n classes, and the server is asked to prove a predetermined number of visits form a random class. According to another embodiment of the method of the present invention, the clients are divided at random into n classes, and wherein the server is asked to prove a predetermined number of visits from at least one predetermined class.

According to an embodiment of the method of the present invention, a number of measurements in which the method is used is of the same order as d, the degree of y in P, times the number of classes n.

According to an embodiment of the method of the present invention, interacting includes a server counting client turnover or counting visits by clients of a predetermined audience of counting requests for royalty-payment-requiring-property or counting requests for an access-cost payment-service by a third party or counting coupons received from clients; and wherein processing at end of time frame includes a proof for any of said countings.

According to an embodiment of the method of the present invention, a server verifies the answer received from the client.

According to an embodiment of the method of the present invention, a client's answer has a domain that is unknown to the server.

The principal property of the metering method of the present invention is that the server is able to present to an auditor a short proof for the number of services it has performed. An auditor can verify this proof. Suppose that a Web server generated a proof for serving one million different clients. Then in the method, according to the present invention, this is a proof in its mathematical sense, i.e. its security is based on mathematical (cryptographic) principles, and a legitimate proof cannot be generated unless the server has actually served one million clients. The proof is short. The length of a proof for serving n clients is fixed (independent of n) or is at most of a much smaller order than n. This is essential, since otherwise the task of sending and verifying such proofs would burden the auditor; being of the same order of complexity as the original services. It is also important that the clients would not be overloaded by this auditing process. In the method, according to the present invention, the modifications the clients should perform are minimal (e.g. a simple plug-in in the client's browser) and there is no need to change the communication pattern. Each client should obtain (only once) some personalized information from the auditor, which requires a single message to be sent from the auditor to the client. The methods can also be extended to protect the user's privacy and not enable a mechanisms for tracing their activities.

For the application of Web site usage metering, the method according to preferred embodiment of the present invention also measure the turnover of clients. That is, to determine the rate with which new clients approach the site. This data is important for advertisers. Such measurement can also prevent sites from using a fixed group of (possibly corrupt) clients to prove high popularity.

The problem of designing accounting mechanisms that will operate with the existing infrastructure of the Internet attracted some previous research [Estrin or Fang]. The preferred embodiment of the method of the present invention is innovative in providing an efficient and secure measurement of the number of packets that a network transfers for other networks, and in producing a short proof for this count. The method is secure against tampering attempts by networks that try to inflate the count of the packets, which they communicated. Considering the amount of money that is expected to be paid for Internet connectivity (e.g. 50 million users who pay $20 per month equal $12 billion annually), it is apparent that secure accounting is essential.

A few other applications for the metering methods can be:

(a) Targeted audience: The methods can be used to measure the interaction of a Web site with a specific audience that is of special interest. For example, they can be used by advertisers in a medical information Web site to count the number of MDs (medical doctors) who visit the site.

(b) Royalties: Servers might offer content (or links to content) which is the property of other parties. The metering methods can be used to measure the number of requests for this content in order to decide on the sum that is paid to the content owners.

(c) Reversing access costs: An application which was suggested in [Franklin] is to enable users a free connection to sites whose owners are willing to pay for the access costs (as is the case with 800 telephone numbers). These connections will be measured and the sites will pay the users' ISPs accordingly.

(d) Coupons: Imagine a newspaper (e.g. the Wall Street Journal) that distributes coupons to its clients, which give them access to an online service (e.g. for obtaining online stock quotes). Then the metering methods can be used by the online service to provide verifiable measurements of the exact number of users who have used these coupons.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

In the context of the present invention, "system" and "scheme" are often used to relate to the method of the present invention, an embodiment thereof, or a significant aspect thereof.

The general setting in which the metering methods operate and give a high level description of their operation is presented according to the present invention; also specifying the requirements that the method should satisfy. In order to be more specific the preferred embodiment, according to the present invention, presented concentrates on methods for metering visits to Web sites, as a non-limiting example of the present invention.

Figure 1:
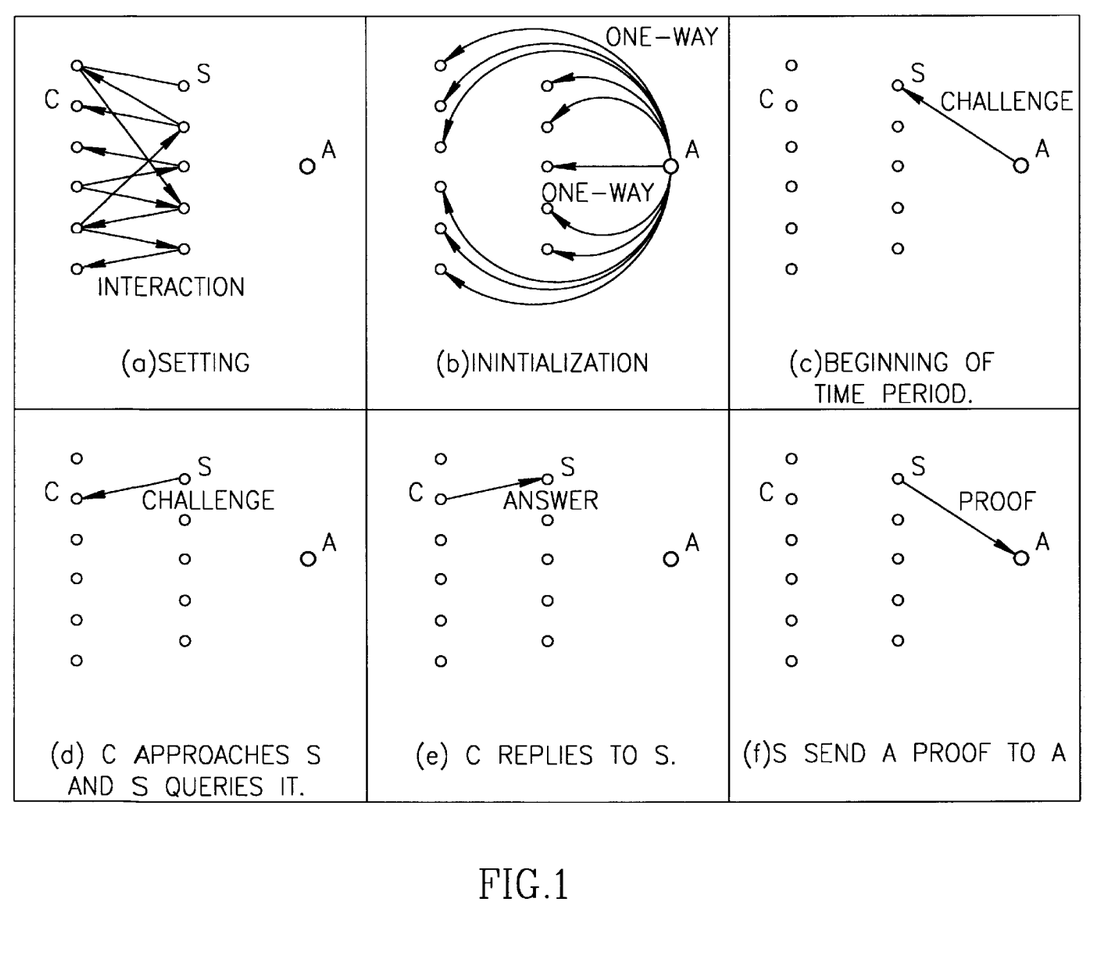
FIG. 1 is a schematic illustration of the setting of the metering scheme.

The setting and the general operation of the metering methods are depicted in FIG. 1. There are servers (denoted S) and clients (denoted C), which interact, and the metering method should measure this interaction (FIG. 1a). A new party, the audit-agency "A", is responsible for providing measurement reports about all servers. The audit-agency is trusted by all parties for the task of providing accurate reports (but not for other tasks, e.g. servers do not want to provide a full list of all their clients to "A"). The metering "system", being an embodiment of the method of the present invention, measures the number of visits that each server receives in a certain period of time (e.g. a day). Alternatively, the "system" can be set so that each server will provide a proof to the audit-agency as soon as it receives k new visits (where k is a system parameter). A visit can be defined to be any unit which is of interest (e.g. a "hit", a "click", a page visited by a user, a session of a single user, a session of more than some threshold of time or hits, etc.).

The operation of the system, being an embodiment of the method of the present invention, is divided into the following stages:

(a) Initialization: (FIG. 1b) This stage occurs once at the beginning of the life time of the system, or every some long period of time (e.g. monthly or yearly). The audit-agency chooses a random key and securely sends to each server and client some data that depends on this key and on the identity of the receiving party. This communication is one-way, from the audit-agency. (In some applications, like Web site usage metering, it is preferable that clients perform some initial registration process before receiving the initialization data. This should prevent fraudulent acquiring of initialization data for multiple clients by the same body). It should be noted that initialization of additional participants in the accounting may occur at any time.

(b) Beginning of metered time frame: (FIG. 1c) A sends to each server S a different challenge.

(c) Interaction with a client: (FIGS. 1d,e) S sends to the client C a challenge, which depends on the challenge that the server received from the audit-agency. C replies with an answer that is a function of the challenge and of the information that C received in the initialization stage.

(d) End of time frame: (FIG. 1f) S performs a computation which depends on the answers it received from clients, and sends to the audit-agency a proof for the number of clients it served. The audit-agency might query S a little to verify the correctness of the proof.

This is the most general form of a metering method. In order to save communication rounds it is preferable, according to the preferred embodiment of the present invention, that no explicit challenges are sent; but rather the challenges can be implicitly computed by the servers and clients.

Note that the only communication between the audit-agency and the clients is a single one-way initialization message in the initialization stage. The changes in the operation of the client are minimal. They should ideally be coded in the Web browser but can also be operated from a plug-in or a helper application.

Requirements for the method according to the present invention include:

Security: It should be impossible for a server S to inflate the count of visits that it claims to have served. The server should be able to mathematically prove that it had a certain number of visits. On the other hand, a server should be protected from subversive clients who might not be willing to help it in creating the proof. For example, if the server is able to detect such clients at the time that they request service then it can refrain from serving them.

Efficiency: Efficiency is a strict requirement of metering schemes since otherwise the large scale of the metered interaction would make the schemes useless (as is the case with using micropayment schemes for metering). It is essential for scalability that the metering system, being an embodiment of the method of the present invention, preserve the existing communication pattern, and in particular not require communication between clients and the audit-agency, or require mass communication between the server and the audit-agency. The computation and memory overheads should be minimal, especially for the client, who does not have a direct gain from the metering system. An additional motivation for limiting the overhead of clients is to enable them to quickly compute their answers. This allows servers to adopt a policy of not serving clients until they send the required response.

Accuracy: The results of the metering scheme should be as accurate as possible. The requirements are of the form "if a server S shows k hits, then with probability (1−delta) it had at least 1−epsilon)k hits", and "if a server S had at least (1+epsilon)k hits, then with probability (1−delta) it would be able to show at least k hits". The parameters delta and epsilon should be minimized.

Privacy: The metering scheme should not degrade the privacy of clients and servers, and in particular should not require servers to store the details of every visit and send these details to the audit-agency. A nice feature would be to enable client anonymity in the sense that even a server would not be able to tell whether the same client performed several visits.

Turnover: An important feature of a metering scheme is to measure the turnover of clients, i.e. the ratio between old and new clients who visit a server. For example, it should be possible to tell whether most of the clients who visit a server during a certain day have also visited it in previous days. Metering turnover is important for advertisers, they can tell for example whether new or returning visitors see their ads. It also measures the loyalty of clients to sites. Such entering can also prevent corrupt servers or "entrepreneurs" from organizing a large group of clients and selling their services as "visitors-per-pay". Such a group might be composed of legitimate clients and therefore their visits should be counted. However, if a server relies on a single group of clients to prove that it had many visitors then it will not be able to prove a nice turnover of clients. The method of the present invention is also useful to check turnover of clients.

According to the present invention there are several directions for designing secure and efficient metering methods, based on hash trees, pricing-via-processing, secure function evaluation and micro-payments. The metering methods with the best properties are based on secret sharing.

According to the present invention there are several directions for designing secure and efficient metering methods, based on hash trees, pricing-via-processing, secure function evaluation and micro-payments. The metering methods with the best properties are based on secret sharing.

According to an embodiment of the present invention, schemes check whether a server receives k visits during a certain time frame (e.g. during a day). A different approach is that whenever a server has k new visits it proves this fact to the audit-agency.

A k-out-of-n secret sharing method enables a secret to be divided into n shares such that no k−1 shares reveal any information about the secret, but any k shares enable to recover it. The preferred embodiment of the present invention is based on a modified version of the polynomial secret sharing scheme of Shamir. However, there are also many other secret sharing schemes which are applicable, for use with the method of the present invention, in the construction of metering schemes. Other embodiments of the method of the present invention also relate to different variations of secret sharing based schemes, which achieve different security, efficiency and accuracy properties. The basic scheme according to the present invention checks whether servers received k visits in a certain time frame, where k is a predefined parameter.

In "Shamir's method" the secret can be any value V in a finite field F (e.g. V is an integer between 0 and p−1 where p is prime). The party that wishes to perform the secret sharing chooses a random polynomial Q(x) of degree k−1, subject to the condition Q(0)=V. The n shares are the values Q(1), Q(2), ..., Q(n). Given any k of them it is possible to perform a LaGrange interpolation and obtain Q and V=Q(0). It is easy to verify that no k−1 shares define Q(0).

The rational behind establishing metering methods on secret sharing is to give each client a share, which it will send to a server when visiting it. Then after serving k clients the server recovers the secret, which is the proof for serving k clients. However, this straightforward implementation has only a single secret and cannot be used by many servers or for several measurements. There is also the problem of protecting the server from malicious clients who send incorrect share, which cause an incorrect "secret" to be computed. The method, according to the present invention, solves these problems and others. The basic method has three parameters, k, d, and p. It enables servers to prove that they received k visits, where k is a predefined parameter. The parameter d defines the number of measurements for which the method can be used, and p is the probability with which a server can generate a proof without serving k clients. Following is a description of the method set to enable servers to prove that they served k visits during a day.

Figure 2:
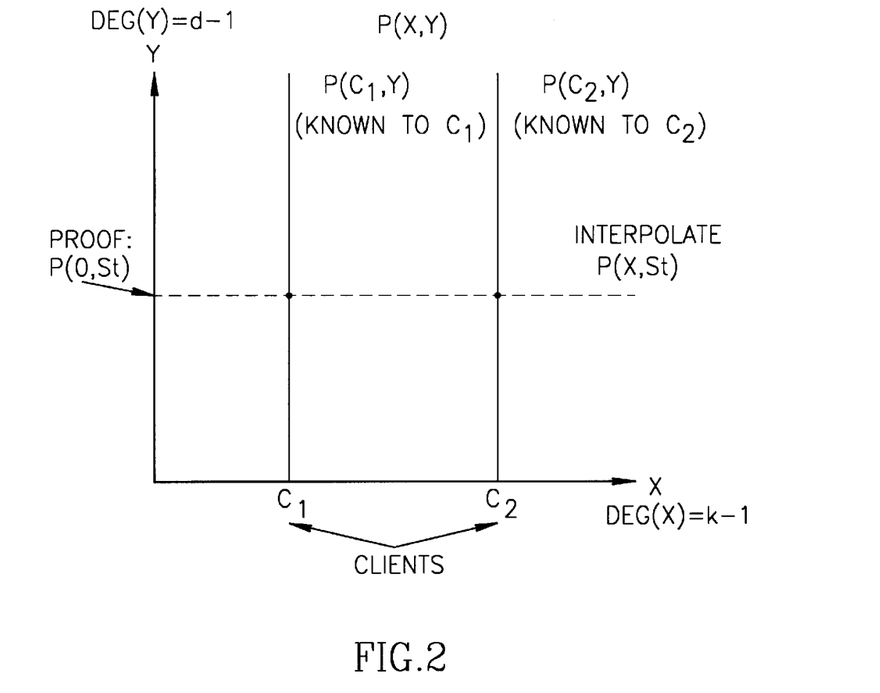
FIG. 2 is a schematic illustration of the basic secret sharing metering scheme.

The Basic Scheme (see FIG. 2)

The basic metering scheme uses a bivariate polynomial rather than a univariate one, in order to share many secrets that serve as proofs for the different servers. The system has three parameters k, d and p. These parameters determine the number of visits measured in a time-frame (k) and the security (d and p).

Initialization: The audit-agency A chooses a random bivariate polynomial $P(x,y)$ over a finite field $Z_p$, which is of degree k−1 in x and degree d−1 in y. It sends to each client C the univariate polynomial $Q_c(y)=P(C,y)$, which is constructed from P by substituting the value C for the variable x. That is, $Q_c$ is a restriction of $P(x,y)$ to the line x=C, and is of degree d−1. (The scheme will be used to meter k visits, and the parameter d defines the number of time frames in which the scheme can be securely used).

Regular operation: When client C approaches a server S in time frame t, it sends to S the value $Q_c(St)$ the input is a concatenation of S and t, and assuming, for simplicity, that it is in $Z_p$ and that no two pairs (S,t)(S',t') are mapped to the same element.

Proof generation: After k clients have approached the server in time frame t it has k values, $P(C1,St) \ldots P(Ck,St)$, and can perform a Lagrange interpolation and compute $P(0,St)$. This value is the proof that the server sends to the audit-agency. The audit-agency can verify the sent value by evaluating the polynomial P at the point $(0,St)$. (The polynomial P has kd coefficients but its evaluation at this point is efficient since the x coordinate is $0$ and only d terms are non-zero.)

The probability with which a server can generate a proof without receiving k visits is 1/p, and the system can therefore safely use p of 32 bits (say $2^-$−5). Alternatively the system can use $GF(2^{32})$. As the typical fields are small, the basic arithmetic operations are very efficient.

Security

For a given bivariate polynomial P the server is required to find the "proof" which is the value $P(0,y)$ at a certain point $(0,y)$. The security relies on the d-wise independence of the values of P along any line parallel to the y axis, and the k-wise independence of P's values along any line parallel to the x axis. In order to be able to evaluate P everywhere the server needs to know all the kd coefficients, whereas in order to calculate P on points on the line x=0 (or x=i for this matter) the server should know d values of P on this line.

A corrupt server can be assisted by other corrupt clients or servers. A corrupt client C can donate his polynomial and then the server can evaluate P at every point (C,y) and needs one less client in order to prove that it had k visits at a specific time. The information that the client donates is equivalent to d coefficients of P. A corrupt server can donate the information that it received from clients in previous time frames, which is equivalent to k coefficients per time frame.

The following theorem outlines the capabilities of a coalition of Hs corrupt servers and Hc corrupt clients. Its proof is straightforward.

Theorem 1

Consider a coalition of Hs corrupt servers and Hc corrupt clients which has been operating for Ht time frames, such that Hc<k, Hs*Ht<d and (Hc*d)+(Hs*Ht*k)−(Hc*Hs*Ht)<d*k; (the first component of the left side of the inequality is the information known to the corrupt clients, the second component is the information known to the corrupt servers, and the third is the information which was counted twice). Let S be one of the coalition members, which received less than k-Hc visits in one of the time frames. Then S has a probability of at most 1/p in finding the proof required for this time frame.

The polynomial P should be replace in general at least every d time frames, and typically much earlier (against coalitions of servers). A polynomial with a higher degree d can be used for a longer time, but then the storage and computational requirements from the client are also higher.

Another method which reduces the power of colluding servers and does not increase the online run time of clients is to use polynomials of the form $P(x,y,z)$ and consequently $Q_c(y,z)$, where y is substituted with the name of the server that is serving the client, and z is substituted with the time. Then at the beginning of time frame t the client can run a preprocessing stage and substitute t for z. Since this operation can be performed off-line, the degree of z can be relatively high. During run time the client would only have to substitute the identity of the server. If the system should be immune against coalitions of Hs servers for Ht time frames, then the online run time is reduced from O(Hs*Ht) to O(Hs).

Robustness

Even if very few corrupt or erroneous clients send incorrect shares to a server, it cannot reconstruct the secret. The error correction properties of Reed-Solomon codes can be used to efficiently reconstruct the secret of a k-out-of-n secret sharing scheme if there are k+2t shares and at most t of them are corrupt. However, this might not be a sufficient protection if there are many corrupt clients.

Verifiable secret sharing (VSS) enables the recipients of shares to verify that the dealer has sent them correct shares. Non-interactive VSS schemes (e.g. of Feldman or Pedersen) are especially useful. In one application the dealer of the shares (i.e. the audit-agency) is usually trusted, but clients might send corrupt shares. VSS can be employed to prevent that. However, known non-interactive VSS schemes use large multiplicative groups (so that extracting discrete logarithms is hard), and the server should perform about MIN (d,k) exponentiations to verify each share it receives from a client. This is highly inefficient compared to the basic metering scheme, and non-suitable for metering.

The following verification method is much more efficient than using VSS. It is based on the following ideas from Carter, Rabin, and Wegman: Suppose that A asks C to communicate to S a value u in $Z_p$, and wants to prevent C from sending to S any different value. To authenticate the value, A can choose random values a,b in $Z_p$, compute $v=((a*u)+b \bmod p)$, and send (a,b) to S and (u,v) to C. Later C sends to S the pair (u,v) and then S can verify that $v=((a*u)+b \bmod p)$. The probability that S finds u before it receives the information from C, or that C can cheat S, is at most 1/p.

Figure 3:
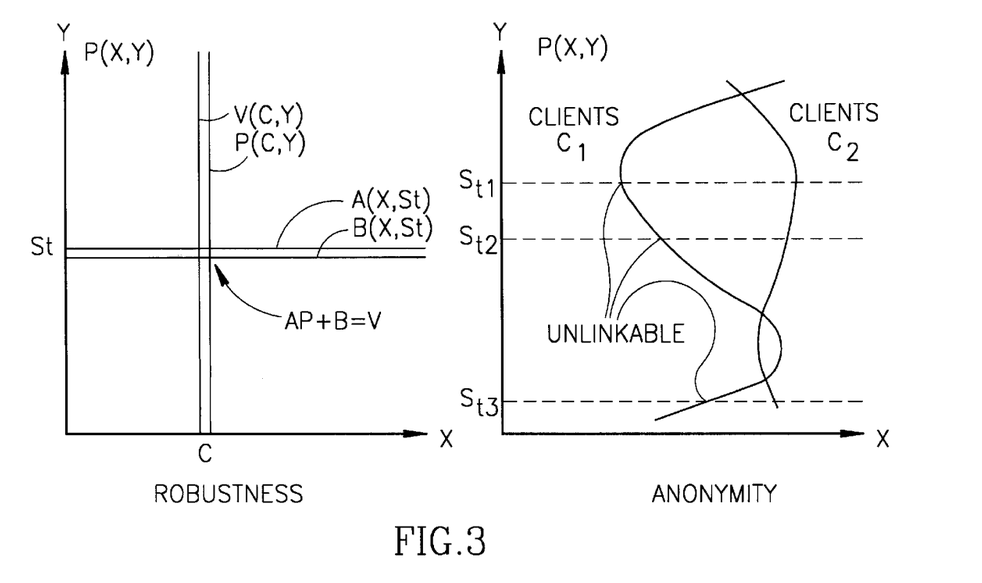
FIG. 3 is a pair of schematic graphs illustrating the robust scheme and the anonymity preserving scheme.

The following metering scheme is robust. It is depicted in FIG. 3 (together with an anonymity-preserving scheme). The scheme uses the following polynomials, all of them chosen at random by A over a field Zp, which is of degree k−1 in x and of degree d−1 in y. A(x,y), of degree Ck in x and Cd in y. And B(y), of degree Cd in y. The audit-agency also computes the polynomial V(x,y)=A(x,y)*P(x,y)+B(y) in Zp.

Initialization: Every client C receives P and V restricted to the line x=C. Suppose the scheme is to be used in Ct time frames, T(1) . . . T(Ct). Then a server S receives Ct restrictions of the polynomials A and B to lines parallel to the x axis, defined by substituting ST(1) . . . ST(Ct) for the value of y.

The operation of the audit-agency in the initialization stage might seem to be too demanding since the polynomial V is pretty large, of degree Ck*(k−1) in x and degree Cd*(d−1) in y. However since V equals A*P+B, the audit-agency can substitute x=C in A and in P (which takes O(k+Ck) multiplications), and then multiply the two resulting polynomials in tie O(d*Cd).

Operation: At time frame t the client C sends to S the values P(C,St) and V(C,St). S evaluates A and B and verifies the identity V=AP+B at the point (C,St). If the identity does not hold then the client is considered corrupt. As before, after receiving information from k clients the server is able to perform an interpolation and find the value P(0,St).

Note that C cannot cheat S with probability better than 1/p without knowing the values of A and B at (C,St). The security against S finding the required value of P (with probability greater than 1/p) is as in the non-robust scheme.
Theorem 2

If the above scheme is used for at most Ct measurements, then a coalition of at most Ck+1 clients or at most Cd/Ct servers has a probability of at most 1/p to succeed in sending a corrupt share to another server.

Increased Efficiency by Using Classes

The operation of the client and the audit-agency only requires the evaluation of a d degree polynomial, and the server should interpolate a polynomial of degree k. Polynomial interpolation is a relatively efficient operation, the complexity of interpolation between k points is only $O(k*\log^2(k))$ multiplications (see e.g. [Aho] p. 299)

These operations are not too complex since the basic operations are performed over a small field. However, the parameters k and d are typically large and therefore it might be desirable to decrease the overhead of the parties. Following is described how to decrease the overhead (for simplicity this for the basic scheme).

The audit-agency decides on a parameter k' and defines n=k/k' classes by choosing n random polynomials P1(x,y) . . . Pn(x,y), each of degree k'−1 in x and degree d−1 in y. It then maps clients to classes by using a random mapping R from the set of clients to 1 . . . n, and giving client C the polynomial $Q_{R(C),C}(y)=P_{R(C)}$ (C,y) (the client knows to which class it is associated). Clients send to S the same messages as before, but to prove that it had k' clients from a specific class the server only need to interpolate a k' degree polynomial.

In one possible variant of this method the audit-agency should require the server to prove that it had k' clients from a specific class r(S,t) (randomly chosen by the audit-agency). The proof is the value $P_{r(S,t)}$ (0,St). An alternative option is to require the server to prove that it had k" visits in each class (where k"<k' but k'−k" is small). According to the method of the present invention, there are also many other choices for electing a number of visits to be proven (or their classes).

The drawback of using classes is that the threshold is probabilistic, which is of course less desirable. For example, for the first variant it is possible (with low probability) that even after k clients have sent their shares the server received less than k' shares from the relevant class and does not have the required proof.

It follows from the Chernoff bound that the probability that after (k'*c)+(c*n) random visits there are less than k' clients from a certain class is at most $2*\exp(-c^2/(2*c+k'))$. This means for example that if this probability is required to be less than 1 then c should be approximately the square root of 10*k', and then the relative size of the "gray area" is c/k' which is approximately the square root of 10/k.

The waiting time for the second variant behaves according to a variant of the "coupon collector" problem.

Anonymity

Anonymity is desired by many clients. An even stronger property is unlinkability, which prevents servers from linking different visits as originating from the same client. At first it seems that secret sharing based metering schemes do not support this property since a client C always sends values of P at points in which x=C. Following is described how to achieve unlinkability of different visits by the same client (exemplified for the basic system).

The anonymity preserving scheme is depicted in FIG. 3, and is as follows:

Initialization: As before the audit-agency generates a random polynomial P over the field that is used. It also generates for every client C a random polynomial Qc(y) of degree u. Consider the polynomial P(Qc(y),y), which is of degree (d−1)+(u*(k−1)). It is a restriction of P to the curve defined by x=Qc(y). The audit-agency sends to C the coefficients which enable it to calculate values of P(Qc(y),y).

Operation: When the client C visits a server S at time t it sends it the values (Qc(h),P(Qc(h),h)), where h=St. After receiving k such values the server can interpolate the polynomial P(x,h) and calculate the proof P(0,h). The information that a client sends in u+1 visits is unlinkable since any u+1 points can be fit to a curve of degree u. Therefore examining this information does not reveal whether these visits were from the same client.

Note that a corrupt audit-agency cooperating with the servers can find out the activity of a client. A possible way around that is for the client to choose its polynomial itself and conduct the initialization process via a secure function evaluation, or alternatively for the client and audit-agency to run an oblivious-transfer process to generate the client's polynomial.

Furthermore, consider a server who received k visits in each of the first u+1 time frames, and in time frame u+2 receives a visit from a client who made one visit in every previous time frame. How can the server check which are the previous u+1 visits of this client? Each visit is hidden among the k visits of its time frame.

An obvious algorithm requires O(k") operations, and therefore might not be practical. For some choice of parameters this problem might not be easy, to say the least.

The methods according to an embodiment of the present invention only check whether a server had k visits, where k is a predefined parameter. A more fine-grained measurement can be achieved by using a smaller value of k (e.g. k=1000). In this case the server is required to provide a different proof for every 1000 visits by presenting different values P(0,Hi) of the polynomial at different locations (Hi is a random challenge picked by the audit-agency and the location (0,Hi) is used for proving the 1000 visits between visit 1000(i−1)+1 and visit 1000i). This variant requires the server to send to its clients the value Hi which is relevant at the time of their visits.

Secret sharing based methods have the property that a server which received almost k visits cannot generate any partial proof and is in the same position as a server which received no visits. However, a server which received only k'<k visits, where k−k' is small, can ask the audit-agency to send it k−k' shares. It can then recover the secret and prove k' visits.

The server-end of the system can be coded rather simply as a CGI script. There can be many approaches for implementing the client-end of the system for web applications. For example:

(a) A simple proxy on the client's machine can perform the handling of metering related messages for the client.

(b) The client browser can invoke a simple helper application whenever it encounters a Web page that requires metering data. The helper application will calculate the required message to be sent to the server.

(c) A plug-in can be used instead of a helper application, and can have better interoperability with the browser.

(d) A Java applet can be used to perform the calculations at the client side. It can be downloaded at the first time the client approaches a server that requires metering data. It must be certified by a trusted party (e.g. the audit-agency) and should have permission to access the sensitive data (the coefficients of the polynomial) at the client.

(e) It is possible to change the code of the browser to perform the metering operations. This is possible in browsers with accessible source code, e.g. as is promised for Netscape 5.0.

After the client has sent the required metering information to the server it might try to approach different pages on the same site, or try to receive the same page at a later time during the same day. For these operations it might be required to send again the same metering data. A simple solution is to store the metering data in a cookie. The server will automatically receive the cookie, check its validity, and only if it is not updated would demand new information from the client. It is easy to ensure this at the client side, that the client machine can verify that it is not being "milked" by the server for information that the server should not receive.

Approaches for Designing Metering Schemes

In addition to secret sharing, there are several other directions that seem helpful for designing efficient and secure metering schemes.

Hash trees: In this solution each client signs a confirmation for its visit. The server arranges these confirmations in a hash tree Merkle and sends its root to the audit-agency, which later verifies the values of random leaves. Additional care should be taken to prevent the server from storing the same value at different leaves (e.g. by using families of perfect hash functions, or by requiring the server to sort the leaves).

Pricing via processing: This approach is similar to the suggestion of Dwork and Naor for combating junk email. The server is given a large computational task by the audit-agency. It should ask each client to perform a small part of this task, whose final completion proves the visit of k clients. Special care should be taken to prevent the server from performing the task by itself, to prevent clients from sending incorrect results, and to minimize the variance of the stopping time.

Threshold computation of a function (e.g. threshold computation of the RSA function): In order to compute a function F each client C receives a share Fc, and F(x) can only be computed by a party which gets k of the clients to compute their partial functions Fc(x) and send her the results. The notion of a threshold computation of a function was introduce din Desmedt, and the most recent implementation of threshold RSA is suggested in Frankel. However known implementations were not designed for large values of n and k, and are far too inefficient in terms of computation and communication to be applicable for metering.

Variants

THE METERING PERIOD: For the simplicity of the exposition, an embodiment of the present invention relates to checking whether a server had k visits in a certain time frame, e.g. during a day. A different approach is that whenever the server has k visits, it proves this to the audit-agency (e.g. a popular server might send such proofs several times a day, whereas a less popular server might do so every few days). In such schemes, the proof for k visits cannot be the value $P(0,St)$, where t is the date. Rather, for every proof the audit-agency should provide the server with a new challenge h, and the server should then ask clients to send it values $P(C,H)$ and supply the proof $P(0,h)$.

Corrupt servers might try to send to clients false challenges h' in order to obtain values $P(C,h')$ they are not entitled to receive. (This can be done in order to receive several values from a client which has several visits in the duration of a single challenge, or to obtain values that might assist another server in computing its proof). A simple solution to this problem is that challenges h start with the identity of the server and are always even numbers. Then a server which should answer the challenge h receives the polynomial $P(.,h+1)$ by the audit-agency. The server should send to client C the challenge h and the value $P(C,h+1)$ as a proof for the validity of the challenge.

CHECKING TURNOVER OF CLIENTS

An important data for advertisers is the rate with which the visitors to a site change (whether the site has loyal clients or whether most of the clients do not return). This measurement is also important against organized groups of clients that might offer their service as visitors-for-pay in order to increase the popularity count of sites. A site that bases its popularity on such visitors will not be able to show a nice turnover of clients.

If a server known $k'<=k$ shares they enable it to wait for just k'−k clients before it can provide the proof for being visited by k clients. It is possible to detect a server that operates in this manner by a system that estimates the intersection of the groups of clients that contributed to different proofs. Advertisers might have additional motivations for checking the turnover of clients.

Following is a coarse description of a system for checking client turnover. Suppose a server is proving k visits per day. Then the audit-agency can use a one-way hash function h with a range of say 10 k. The server is given a challenge t between 1 and 10 k and is required to present, as soon as possible, a share of a client (from a later time period) which is mapped by h to t. If the clients of a server constantly change then this share is expected to be found after about 10 time periods. If the server has a low turnover than it would need considerably more time periods to present a suitable share.

ADAPTABILITY: The secret sharing based metering schemes according to an embodiment of the present invention check whether a server received k clients, where k is a predefined quota. It is of course preferable to have a more flexible measurement unit that enables to count the exact number of visits that a server received. A more fine grained system can be achieved by setting the quota k to be smaller (e.g. k=1000 for measuring web advertising).

A server which received almost k visits cannot provide the required proof and appears to be in the same situation as a server who received very few visits. However, if a server received k'<k visits and k-k' is small it can inform the audit-agency of this situation and ask to receive k' values of the polynomial that it has to interpolate. After receiving these values the server should be able to perform the interpolation and compute the required proof.

We claim:

1. A method for secure accounting and auditing of a communications network, said network having at least one server, a plurality of clients, and at least one audit-agency, the method comprising the steps of: initializing, beginning of a metered time frame, interacting with a client, and processing at end of time frame; wherein:

(a.) initializing includes an audit-agency choosing a substantially random key and said audit-agency securely sending, to each server and to each client, data that depends on at least said key and on identity-data of the server or the client receiving said sending;

(b.) beginning of a metered time frame includes the audit-agency sending a challenge to at least one server;

(c.) interacting with a client, of said initialized clients, includes firstly a server sending to the client a challenge which depends on at least the challenge that the server received from the audit-agency, and secondly the client replying with an answer that is computationally dependant on the challenge that said client received and on information that said client received in its initialization step; and (d.) processing at end of time frame includes firstly a server performing a computation which depends on at least the answers said server received from clients, and secondly sending to the audit-agency a compact proof for the number of clients served by said server.

2. A method according to claim 1 wherein sending to the client a challenge is accomplished implicitly by computations of the servers and of the clients.

3. A method according to claim 1 wherein sending to the server a challenge is accomplished implicitly by computations of the audit-agency and of the servers.

4. A method according to claim 1 wherein a proof for the number of clients served, being K clients visiting a server S in a time period T, includes:

(e.) in the initializing, the audit-agency generating a random polynomial Q(x,y) over a predetermined finite field Zp, of degree k−1 in x and d−1 in y; and each client C receiving the polynomial Qc(y)=P(C,y) which is constructed from P by substituting C for x, and is of degree d−1 in y;

(f.) such that a client C that visits server S at data t sends a value Qc(St)=P(C,ST) wherein St is a function of S and t, in Zp;

(g.) and a proof generation includes, for the polynomial P(x,St), after serving k clients in time period T, S interpolating the polynomial and calculating P(0,St);

(h.) and a proof of serving k clients in time period T by the audit-agency includes verifying this value by evaluating the polynomial P at a predetermined location.

5. A method according to claim 1 wherein the computational dependency of the challenge is based on hash trees.

6. A method according to claim 1 wherein the computational dependency of the challenge is based on pricing-via-processing.

7. A method according to claim 1 wherein the computational dependency of the challenge is based on secure function evaluation.

8. A method according to claim 1 wherein the computational dependency of the challenge is based on micropayments.

9. A method according to claim 1 wherein the computational dependency of the challenge is based on secret sharing.

10. A method according to claim 9 wherein error-correcting properties are used to reconstruct the secret.

11. A method according to claim 1 wherein the interacting includes a client sending a share to a server, said server evaluating a polynomial of degree d−1 wherein said evaluating uses a computation requiring d multiplications using Horner's rule, and said evaluating is performed in a field Zp wherein 1/p is the error probability.

12. A method according to claim 11 wherein the field Zp is set to be 32 bits long.

13. A method according to claim 11 wherein the field Zp is set to be with $2^{32}-5$ elements.

14. A method according to claim 11 wherein the field Zp is set to be a Galois field with $2^{32}$ elements.

15. A method according to claim 1 wherein the clients are divided at random into n classes, and wherein the server is asked to prove a predetermined number of visits from a random class.

16. A method according to claim 1 wherein the clients are divided at random into n classes, and wherein the server is asked to prove a predetermined number of visits from at least one predetermined class.

17. A method according to claim 1 wherein a number of measurements in which the method is used is of the same order as d, the degree of y in P, times the number of classes n.

18. A method according to claim 1 wherein interacting includes a server counting client turnover or counting visits by clients of a predetermined audience or counting requests for royalty-payment-requiring-property or counting requests for an access-cost payment-service by a third party or counting coupons received from clients; and wherein processing at end of time frame includes a proof for any of said countings.

19. A method according to claim 1 wherein a server verifies the answer received from the client.

20. A method according to claim 1 wherein a client's answer has a domain that is unknown to the server.

21. A method according to claim 1 wherein the computational dependency of the challenge is based on quorum systems.

* * * * *